(12) United States Patent
Joseph et al.

(10) Patent No.: US 10,731,539 B1
(45) Date of Patent: Aug. 4, 2020

(54) COMPOSITE EXHAUST FLUE

(71) Applicants: Brian E Joseph, Triadelphia, WV (US); Dwayne R Morgan, Wheeling, WV (US); Brian L Gordon, Wheeling, WV (US); Brandon J Coates, Shadyside, OH (US)

(72) Inventors: Brian E Joseph, Triadelphia, WV (US); Dwayne R Morgan, Wheeling, WV (US); Brian L Gordon, Wheeling, WV (US); Brandon J Coates, Shadyside, OH (US)

(73) Assignee: Touchstone Resarch Labratory, Ltd, Triadelphia, WV (US)

( * ) Notice: Subject to any disclaimer, the term of this patent is extended or adjusted under 35 U.S.C. 154(b) by 0 days.

(21) Appl. No.: 15/967,842

(22) Filed: May 1, 2018

(51) Int. Cl.
  *F01N 13/18* (2010.01)
  *F01N 13/14* (2010.01)
  (Continued)

(52) U.S. Cl.
  CPC ............ *F01N 13/1888* (2013.01); *B32B 3/06* (2013.01); *B32B 5/022* (2013.01); *B32B 5/024* (2013.01); *B32B 5/18* (2013.01); *B32B 5/245* (2013.01); *B32B 5/26* (2013.01); *F01N 13/141* (2013.01); *F01N 13/143* (2013.01); *F01N 13/148* (2013.01); *F01N 13/16* (2013.01); *B32B 2260/021* (2013.01); *B32B 2260/04* (2013.01); *B32B 2262/101* (2013.01); *B32B 2262/105* (2013.01); *B32B 2266/04* (2013.01); *B32B 2307/304* (2013.01); *B32B 2307/306* (2013.01);
(Continued)

(58) Field of Classification Search
  CPC ..... F16L 55/175; F16L 55/16; F16L 55/1686; F16L 55/18; F01N 13/1888; F01N 13/141; F01N 13/143; F01N 13/148; F01N 13/16; B32B 3/06; B32B 5/022; B32B 5/024; B32B 5/18; B32B 5/245; B32B 5/26; B32B 2260/021; B32B 2260/04; B32B 2262/101; B32B 2262/105; B32B 2266/04; B32B 2307/304; B32B 2307/306; B32B 2597/00; B32B 2530/26
  USPC ......................................................... 138/158
  See application file for complete search history.

(56) References Cited

U.S. PATENT DOCUMENTS 3,212,529 A * 10/1965 Ullman .................. F16L 9/003
                                                    138/141
3,317,074 A *  5/1967 Long ...................... F17C 3/06
                                                    220/560.15

(Continued)

*Primary Examiner* — Craig M Schneider
*Assistant Examiner* — David R Deal
(74) *Attorney, Agent, or Firm* — Philip D. Lane

(57) ABSTRACT

A segmented composite exhaust flue which may be used to shield an area or object from convective, conductive, or radiated heat transfer from hot exhaust combustion gases is described. In certain embodiments, the composite exhaust flue may be used to protect structures from hot exhaust gases and particles such as those produced by cars, trucks, ships, boats, jets, rockets, as well as other vehicles with internal combustion engines, turbines, or rocket motors. In some embodiments, a composite exhaust flue may include an attachment frame removeably holding a plurality of ceramic composite panels where the ceramic composite panels have a ceramic fiber reinforced ceramic composite high temperature face sheet positioned over an insulating layer.

16 Claims, 5 Drawing Sheets

(51) Int. Cl.
  *F01N 13/16* (2010.01)
  *B32B 5/02* (2006.01)
  *B32B 5/18* (2006.01)
  *B32B 5/24* (2006.01)
  *B32B 5/26* (2006.01)
  *B32B 3/06* (2006.01)

(52) U.S. Cl.
  CPC ....... *B32B 2597/00* (2013.01); *F01N 2530/26* (2013.01)

(56) References Cited

U.S. PATENT DOCUMENTS

| | | | | |
|---|---|---|---|---|
| 3,975,877 | A * | 8/1976 | Walton | E04B 2/7854 52/282.3 |
| 4,050,604 | A * | 9/1977 | Flanders | B65D 7/24 220/4.28 |
| 5,391,840 | A * | 2/1995 | Hughes | H02G 3/0412 174/68.3 |
| 5,749,399 | A * | 5/1998 | Reyes Zorrilla | F24F 13/0209 138/120 |
| 5,791,806 | A * | 8/1998 | Giehl | E04B 2/7809 403/117 |
| 5,918,644 | A * | 7/1999 | Haack | F16L 9/003 138/146 |
| 5,975,146 | A * | 11/1999 | Lardillat | F16L 59/147 138/149 |
| 8,033,410 | B2 * | 10/2011 | Afflerbach | B65D 19/18 220/617 |
| 8,210,379 | B2 * | 7/2012 | Afflerbach | B65D 11/1873 220/4.31 |
| 2011/0011855 | A1 * | 1/2011 | Han | A47B 47/05 220/4.33 |
| 2011/0019362 | A1 * | 1/2011 | Krietzman | H05K 7/20736 361/690 |

* cited by examiner

COMPOSITE EXHAUST FLUE

FIELD OF THE INVENTION

The present invention pertains to flues or exhaust systems for gases escaping or emanating from a combustion engine.

BRIEF SUMMARY OF THE INVENTION

Embodiments of the present invention may include a composite exhaust flue for a vehicle having at least one composite exhaust flue segment defining a throughbore extending therethrough. The at least one composite exhaust flue segment may include an attachment frame for connecting to a vehicle or adjacent segments where the composite exhaust flue segment includes a first end spaced a distance from the first end and held in a fixed relationship by a plurality of frame connectors and a panel retainer on the first end and the second end; and a plurality of composite panels arranged about the throughbore and extending from the first end to the second end and removably held in place by the panel retainer on the first end and second end.

DETAILED DESCRIPTION OF CERTAIN EMBODIMENTS OF THE INVENTION

A composite exhaust flue which may be used to shield an area or object from convective, conductive, or radiated transfer of heat from hot combustion exhaust gases and particles is described. The location of such conductive, convective, or radiated heat may be referred to as a high temperature environment. The objects and/or areas to be shielded may be collectively referred to as "structures." In certain embodiments, the composite exhaust flue of the present invention may be used to protect structures from hot exhaust gases and particles such as those produced by vehicles like cars, trucks, ships, boats, jets, rockets, as well as other vehicles with internal combustion engines, turbines, or rocket motors.

Vehicles and the structures making up the vehicle shift and flex to some degree while the vehicle is in motion or operation. The degree or amount flexing associated with the vehicle varies depending on the vehicle design. Due to the flexing of the vehicle during operation, attachment of ceramic composite panels directly to the structure creates a significant amount of stress on the attached ceramic composite panel. While the ceramic composite panels will be discussed in detail below, ceramic composite panels do not tolerate deflection or flexing very well without incurring damage such as cracking or breaking of the composite. These cracks or breaks to the composite panels significantly reduce the high temperature insulating or thermal shielding properties of the ceramic composite panels posing a risk of damage to the structure of the vehicle or the occupants and components within the structure of vehicle.

Figure 1:
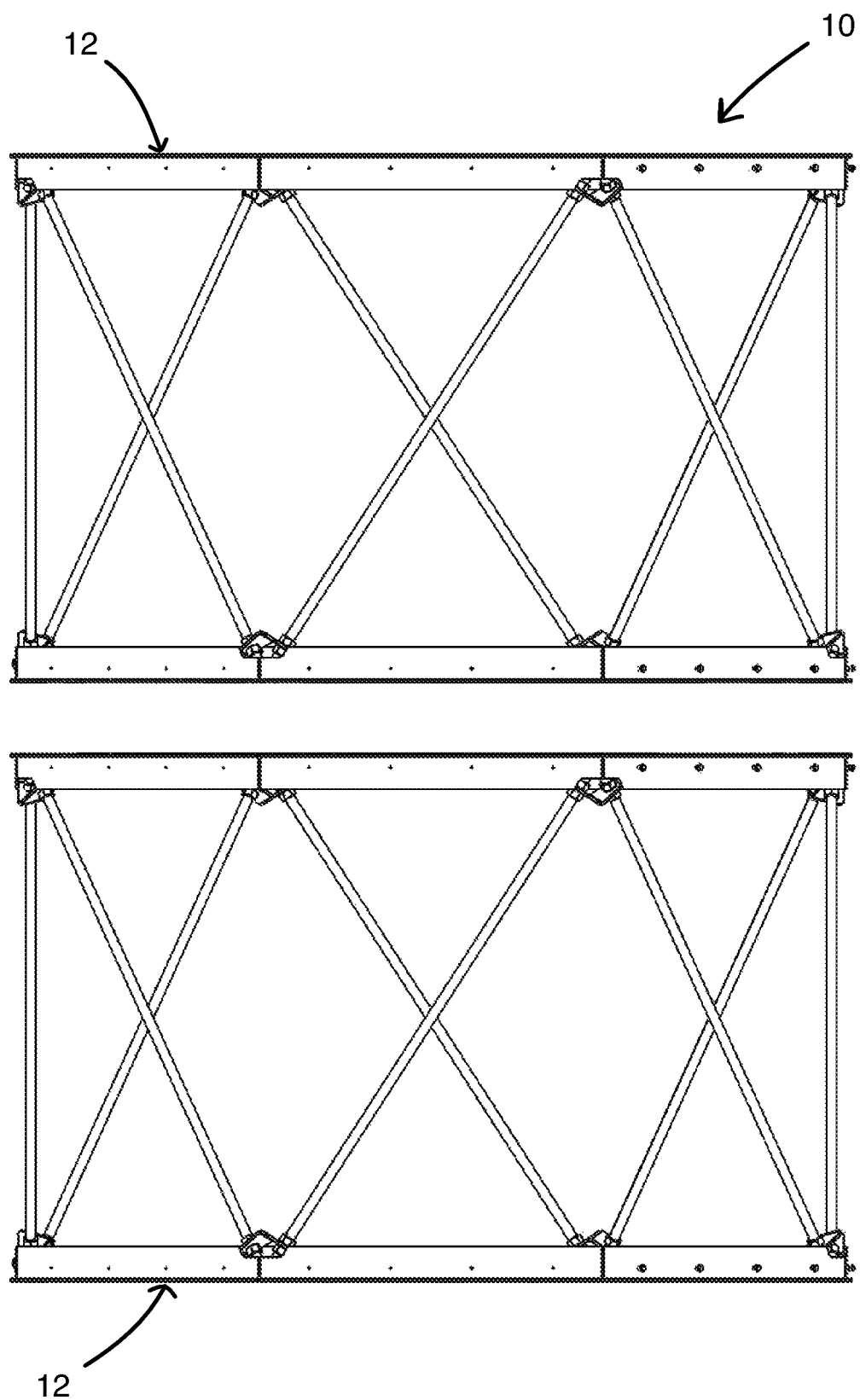
FIG. 1 is a diagrammatic representation of a composite exhaust flue having more than one composite exhaust flue segments in accordance with an embodiment of the invention.

With reference to FIG. 1, there is shown therein a composite exhaust flue 10 in accordance with an embodiment of the present invention. The composite exhaust flue 10 may be constructed from one or more composite exhaust flue segments 12 connected together to form the composite exhaust flue 10. In FIG. 1, the exhaust flue segments are shown separated to clearly show the two exhaust flue segments. In practice, adjacent exhaust flue segments will be connected to one another by any variety of means, such as by welding, using nut and bolt type fasteners, and other fasteners known to those skilled in the art. The size, configuration, and number of composite exhaust flue segments 12 may vary depending on the size, shape, and design of the vehicle. As will be appreciated, the modular nature of the composite exhaust flue of the present invention enables a wide range of design configurations by using multiple composite exhaust flue segments based on the needs of the vehicle.

Figure 2:
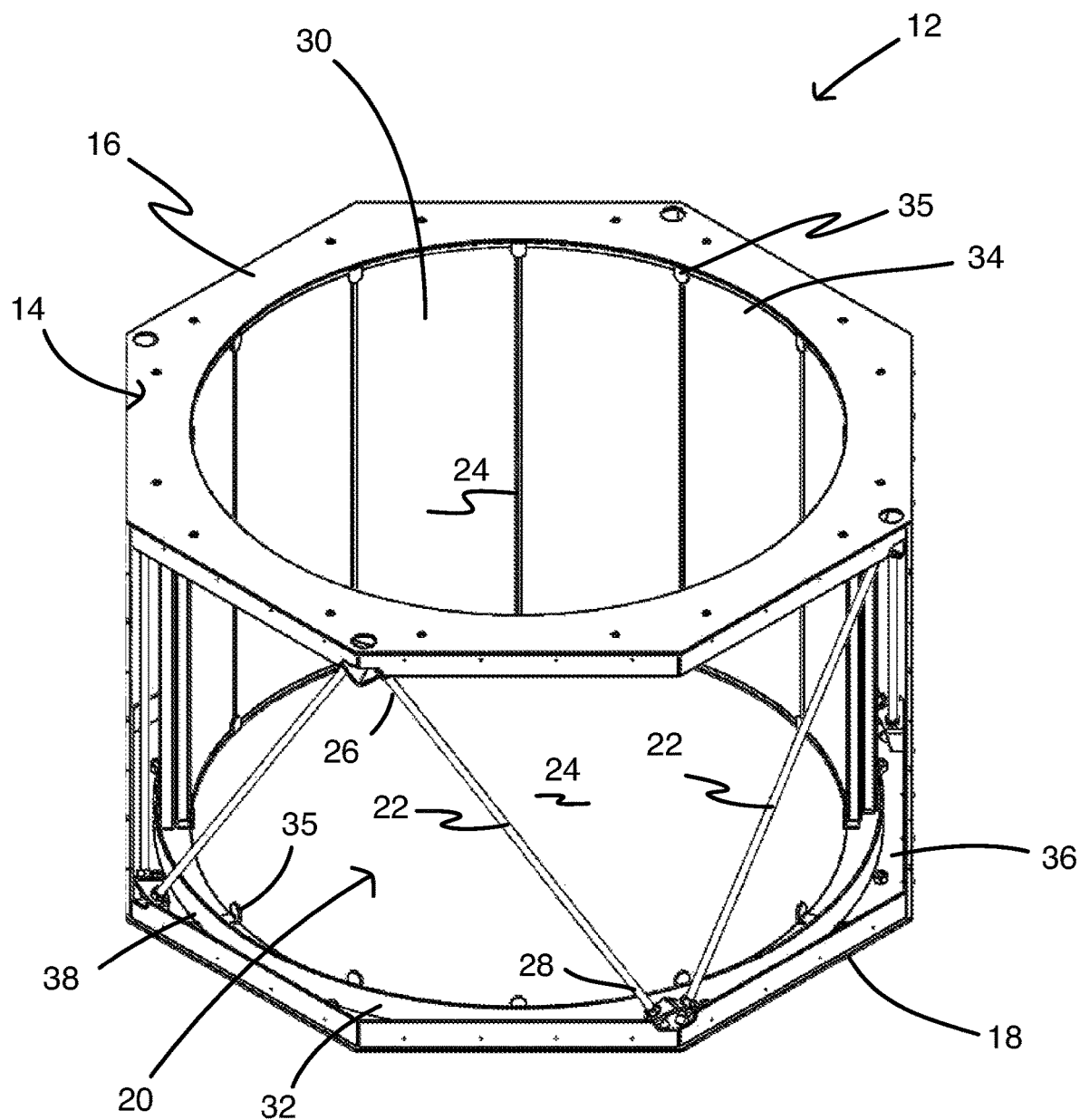
FIG. 2 is a diagrammatic representation of a composite exhaust flue segment in accordance with an embodiment of the invention illustrating partial installation of the composite panels.

Turning now to FIG. 2, a composite exhaust flue segment 12 provides an attachment frame 14 adapted to securely attach to the structure of the vehicle or, depending on location in the composite exhaust flue, to an adjacent composite exhaust flue segment. The attachment frame 14 includes a first end 16 spaced a distance from the second end 18 and a throughbore 20 extending through the composite exhaust flue segment through the first end and the second end. Hot combustion exhaust gases from a hot combustion source, such as an engine, pass through the throughbore of the composite gas flue. One or more frame connectors 22 extend and connect the first end 16 to the section end 18 and holds the first end 16 and the second end 18 in a fixed relationship to one another.

The first end 16 and the second end 18 each define an opening 24 that is substantially commensurate in size and shape with the throughbore 20 of the composite exhaust flue segment 12. In preferred embodiments, the opening 24 has a perimeter that is substantially similar in size and shape as the perimeter of the throughbore 20. The perimeter of the opening 24 may be slightly larger or smaller than the perimeter of the throughbore 20. The shape of the opening 24 in the ends is not particularly limited and may take on any desired shape, including but not limited to a circle, ellipse, square, triangle, rectangle, or other polygon. Preferably, the size and shape of the opening does not significantly impede or otherwise hinder the flow of exhaust gases to the detriment of the operation or function of the vehicle. Further, depending on the design of the composite exhausts flue, the opening in the first end 16 may have a different size and shape than the opening in the second end 18.

In some embodiments, the first end 16 and second end 18 are relatively planar. In other embodiments, at least one of the first end 16 and second end 18 is sized and shaped to match the surface of the structure in which the composite exhaust flue segment 12 is intended to be mounted. In additional embodiments, at least one of the first end 16 and second end 18 is sized and shaped to match the surface of the end of an adjacent composite exhaust flue segment. In some embodiments, first end 16 is parallel or substantially parallel to second end 18. In other embodiments, first end 16 and second end 18 are angled with respect to each other such that first end 16 and second end 18 are nonparallel to one another.

The first end 16 and the second end 18 are spaced apart and held in a fixed relationship by a plurality of frame connectors 22. The frame connectors include a first connector end 26 connected to the first end 16 and second connector end 28 connected to the second end 18. The frame connectors may be in the form of rods, bars, I-beams, tubes, and other similar shapes. Further the frame connectors may be made from any material having sufficient strength to hold the first end 16 and the second end 18 at the designated distances during operation of the vehicle. Suitable materials may include, but are not limited to, steel, iron, aluminum alloys, titanium alloys, polymer composites, fiber reinforced polymer composites, ceramic composites, fiber reinforced ceramic composites, and combinations thereof and other similar materials used for structural purposes.

The attachment frame 14 is adapted to hold a plurality of ceramic composite panels around the perimeter of the throughbore 20, one such ceramic composite panel being designated by the reference numeral 30. In certain embodiments, each of the first and second ends of the planar portion includes an outer panel retainer 32. The outer panel retainer 32 is adapted to hold the ceramic composite panels 30 around the perimeter of the throughbore 20 and prevent the panel end 34 of the ceramic composite panel 30 from deflecting or moving significantly beyond the perimeter of the throughbore 20. In some embodiments, the outer panel retainer 32 is positioned on an interior surface 36 of the first and second ends. In some embodiments, the outer panel retainer 32 is a retainer wall 38 positioned about the perimeter of the throughbore 20 and extending from the interior surface 36 of the first and second ends of the attachment frame 14. The outer panel retainer wall 38 may be continuous or may be wall segments or tabs positioned about the perimeter of the throughbore 20. In other embodiments, the outer panel retainer 32 may be in the form of a panel receiving channel or groove on the interior surface 36 adapted to receive the end of a ceramic composite panel. In some embodiments the panel retainer may include a combination of one or more panel receiving channels and one or more panel retainer walls.

Importantly, the outer panel retainer 32 holds the ceramic composite panels 30 about the throughbore 20 but allows the ceramic composite panels enough freedom of movement such that the ceramic composite panels may move or shift without significantly deviating from the perimeter of the throughbore, without incurring damage, and still provide the insulating and shielding properties required for the exhaust flue. In some embodiments a plurality of inner panel retainers 35 may be used to prevent ends of the panels 30 from deflecting into the area of the throughbore. The inner panel retainers 35 are attached to the first end 16 and the second end 18 and are sized and positioned about the throughbore and spaced a distance from the outer panel retainer 32 to hold the composite panels 30 in place about the throughbore 20, yet allow for removal of the composite panel 30, if necessary.

Preferably, the ceramic composite panels 30 are not fixedly attached to the attachment frame 14 but rather physically contact or be constrained by portions of the outer panel retainer 32, inner panel retainers 35, and attachment frame ends 16 and 18. In this way the ceramic composite panels 30 are allowed to "float" as needed within the attachment frame 14. In some embodiments, a flexible polymer may be used to connect the first end and the second ends to the respective panel ends and help seal any space between the panel ends and the first and second ends of the attachment frame. The flexible polymer must be sufficiently pliable to allow the composite panels to move as needed to avoid damage yet be able to withstand the operating temperatures of the composite exhaust flue without significant degradation. The flexible polymer may include, but is not limited to, silicone sealants or gasket materials.

The size, number, and orientation of the frame connectors between the first end and the second end is not particularly limited. Preferably each of the variables for the frame connectors are optimized to reduce the weight of the attachment frame while still meeting the structural requirements of the attachment frame 14. Preferably, at least two of the frame connectors 22 are spaced apart a sufficient distance that a ceramic composite panel 30 may be passed between the adjacent frame connectors and put in place about the throughbore 20 in the attachment frame without having to disconnect one or more frame connectors. This feature has the advantage of easily replacing one or more ceramic composite panels without the need for disassembling the composite exhaust flue or the attachment frame of a composite exhaust flue segment.

The materials available for the attachment frame 14 and the components making up the attachment frame such as the first end 16, the second end 18, and the frame connectors 22, are not particularly limited and may be made from any material that provides sufficient strength and durability for its use in the composite exhaust flue segment. Suitable materials may include, but are not limited to, iron, steel, titanium alloys, aluminum alloys, and other metal alloys for structural components, polymer composites, fiber reinforced polymer composites, ceramic composites, fiber reinforced ceramic composites, and combinations thereof. Different components of the attachment frame may be made from the same material or different materials depending on the needs of the composite exhaust flue. Further, different composite exhaust flue segments within the composite exhaust flue may be constructed from different materials based on the physical and structural requirements of the composite exhaust flue. Some composite exhaust flue segments and components may require higher strength requirements than other composite exhaust flue segments and components within the same composite exhaust flue.

Figure 3:
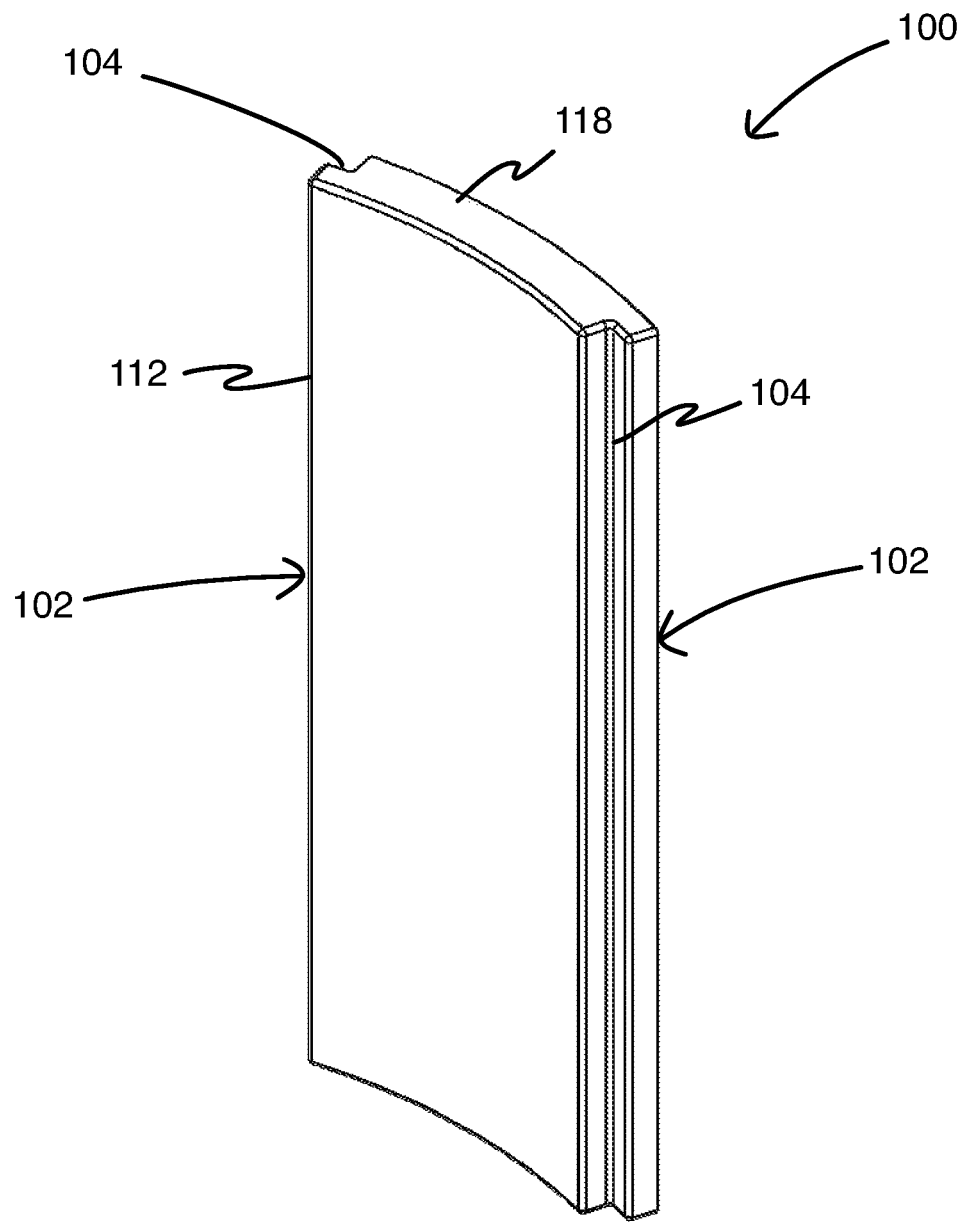
FIG. 3 is a diagrammatic representation of a ceramic composite panel in accordance with an embodiment of the invention.

Turning to FIG. 3, an embodiment of a ceramic composite panel 100 is illustrated. The ceramic composite panel has sides 102 that engage with and interlock with sides of adjacent ceramic composite panels through panel side connectors 104. The ceramic composite panel sides 102 each have a panel side connector 104 adapted to receive the side of an adjacent ceramic composite panel. In some embodiments, the panel side connector 104 may be configured as to provide lap joints, tongue and groove joint, and other similar joints. The configuration of the panel side connectors 104 provide for non-permanent complementary mating engagement of sides of adjacent ceramic composite panels. Preferably, the physical contact of the sides of the ceramic composite panels provides enough support through the configuration of the side panel side connectors that glues, adhesives, and other more permanent attachment components are not necessary. This allows for easy replacement of one or more of the ceramic composite panels when necessary.

Figure 4:
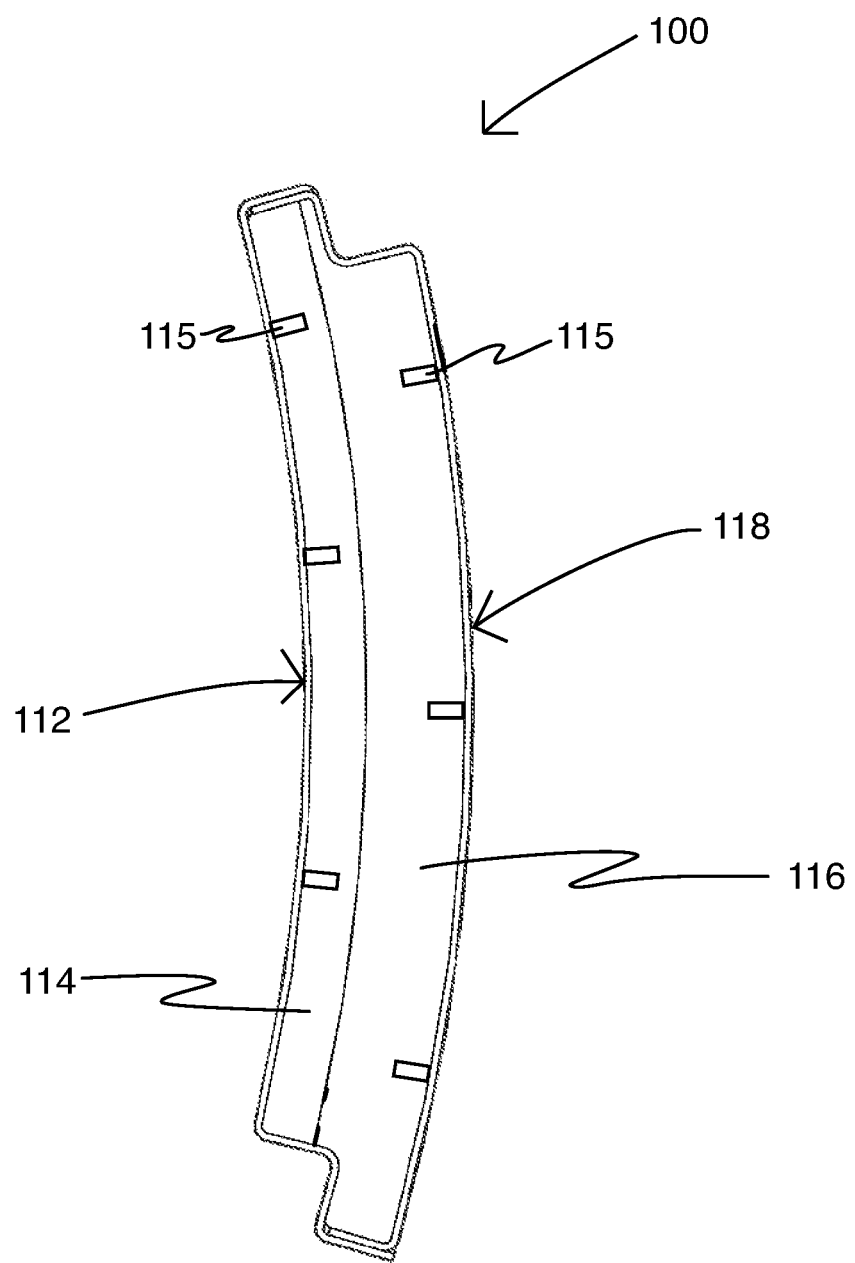
FIG. 4 is a cross-sectional diagrammatic view of a ceramic composite panel in accordance with an embodiment of the invention.

With reference now to FIG. 4, there is illustrated a ceramic composite panel 100 in accordance with an embodiment of the present invention. The ceramic composite panel 100 includes a ceramic fiber reinforced ceramic composite material ("CFCC") face sheet 112 positioned over an insulating layer 114 and spaced a distance from an outer panel layer 118. The ceramic composite panel 100 is designed such the structure of the vehicle is exposed to a temperature less than the temperature of the exhaust gases traveling through the through bore. In some embodiments, the temperature reduction ranges from about 20% to about 90% and preferably at least about 50%.

The CFCC face sheet 112 will generally be the layer of the ceramic composite panel that will be in contact with the high temperature environment traveling through the throughbore of the exhaust flue. The CFCC face sheet 112 is a material that is mechanically and chemically robust with respect to the high temperature environment to which the high temperature composite will be exposed. In certain embodiments, the CFCC face sheet 112 may withstand temperatures of at least about 700° F. without significant physical or chemical degradation. In some embodiments, the CFCC face sheet 112 may withstand temperatures ranging from about 700° F. to about 2000° F., or higher without significant mechanical or chemical degradation. In certain embodiments, the CFCC face sheet 112 may be chemically inert with respect to hot combustion products produced by internal combustion engines, turbines, or rocket motors. The hot combustion products may include hydrocarbon combustion products such as carbon dioxide, carbon monoxide, water, and hydrocarbon products resulting from incomplete combustion. The hot combustion product may also include, but is not limited to, oxides of nitrogen and sulfur, as well as particulates in the exhaust gas. The CFCC face sheet 112 may have a low thermal conductivity. In certain embodiments, the thermal conductivity may be below about 100 W/m K, in additional embodiments below about 50 W/m K. In various other embodiments, the thermal conductivity may be below about 30 W/m K. In still other embodiments, the thermal conductivity may be below about 10 W/m K, and in still further embodiments, the thermal conductivity may be below about 3 W/m K. In some embodiments, the thermal conductivity may range from about 1 W/m K to about 30 W/m K.

The CFCC face sheet 112 is a ceramic fiber reinforced ceramic material comprising ceramic fibers embedded within a ceramic matrix material. The ceramic matrix material may include, but is not limited to, metal oxide ceramics such as alumina, silica, magnesia, zirconia, and other refractory ceramics such as nitrides, borides, carbides, silicon carbide, and other ceramics that are able to with stand the operational conditions of the thermally insulating composite. The ceramic fibers may include fibers comprising any of the ceramic materials described above for the ceramic matrix. The ceramic fibers may include, but are not limited to, metal oxide ceramic fibers such as alumina fibers, silica fibers, magnesia fibers, zirconia fibers, and other refractory ceramic fibers such as fibers made from nitrides, borides, basalts, carbides, silicon carbide, and other ceramic materials that are able to withstand the operational conditions of the thermally insulating composite. In certain embodiments, glass or quartz fibers may be used as the ceramic fibers. In some embodiments, the ceramic fiber reinforced ceramic material comprises alumina fibers embedded in an alumina matrix.

The thickness of the CFCC face sheet 112 is not particularly limited and may depend upon a variety of design factors. For many embodiments the thickness of the CFCC face sheet may be at least about 0.02 inches. For some embodiments, the thickness of the CFCC face sheet may range from about 0.02 inches to about 1 inch, or greater. In certain embodiments, the thickness of the CFCC face sheet may range from about be about 0.1 inches to about 0.5 inches. In other embodiments, the thickness of the CFCC face sheet may range from about 0.1 inches to about 0.25 inches.

With continued reference to FIG. 4, an insulating layer 114 is provided between the CFCC face sheet 112 and an outer panel layer 118. The insulating layer 114 is a layer of material that is mechanically and chemically robust with respect to the high temperature environment in which the high temperature composite will be used. In certain embodiments, the insulating layer 114 may withstand temperatures of at least about 700° F. without significant physical or chemical degradation. In some embodiments, the insulating layer 114 may withstand temperatures ranging from about 700° F. to about 2000° F., or higher without significant mechanical or chemical degradation. In some embodiments, the insulating layer 114 is physically and chemically robust over the same or similar temperatures as the CFCC face sheet 112.

The insulating layer 114 is adapted to reduce the heat transport from the CFCC face sheet 112 to the outer panel layer 118 whereby the outer panel layer 118 is exposed to a temperature about equal to or below the use temperature of the outer panel layer 118. The use temperature of the outer panel layer 118 is that temperature above which, the material comprising the outer panel layer begins to lose its chemical and physical integrity in air. Further the insulating layer 114 aids in reducing the desired environmental temperature for the space outside the composite exhaust flue.

In certain embodiments, the insulating layer 114 may comprise one or more layers of a flexible or compressible ceramic material. The flexible or compressible ceramic material may be in the form of felts, wools, cloths, other woven or non-woven ceramic textiles, or ceramic materials. The ceramic material used for the insulating layer 114 may comprise, but is not limited to, metal oxides, nitrides, borides, basalts, carbides, silicon carbide, and other ceramic materials meeting the temperature requirements of the thermally insulating composite. The metal oxides may include, but are not limited to alumina, silica, magnesia, zirconia, and other metal oxides. In some embodiments, the insulating layer 114 may comprise glass or quartz fibers.

The thickness of the insulating layer 114 is not particularly limited and may vary widely depending on a variety of design factors, including but not limited to, the exposure temperature of the high temperature environment, the materials used for the high temperature face sheet, the use temperature of the structural support layer, and the composition and form of the insulating layer. The thickness if the insulating layer 114 should be such that the temperature the outer panel layer 118 is exposed to is less than the use temperature for the outer panel layer 118.

In some embodiments, the insulating layer 114 provides mechanical isolation between the CFCC face sheet 112 and the outer panel layer 118. Still further, the insulating layer 114 may provide acoustical dampening and vibration isolation benefits. As the length of the ceramic composite panel increases, and depending on the orientation of the ceramic composite panel in the composite exhaust flue segment, the CFCC face sheet 112 and/or the outer panel layer 118 may tend to droop or deform and compress the insulation layer. This compression may reduce the insulative value of the insulation layer. To reduce compressing the insulation layer and to reduce breaking the CFCC face sheet due to extreme movements or shocks, in some embodiments, it may be desirable to provide one or more supports 115 between the CFCC face sheet 112 and the outer panel layer 118.

The optional supports 115 may be made from a ceramic material similar or compatible with the materials used for the CFCC face sheet 112. If used, the supports may be positioned between the ceramic fiber reinforced ceramic composite material face sheet 112 and the outer panel layer 118 without physically contacting at least one of the fiber reinforced ceramic composite material face sheet 112 or the outer panel layer 118. The supports 115 may extend from the CFCC face sheet 112 towards the outer panel layer 118, or the supports 115 may extend from the outer panel layer 118 towards, the CFCC face sheet 112, or the ceramic composite panel may include both or some combination of these supports.

Optionally an interior layer 116 may be used with the ceramic composite panel 100 and positioned between the insulating layer 114 and the outer panel layer 118. In certain embodiments the interior layer 116 reduces the temperature from the insulating layer down to or below the use temperature of the outer panel layer 118 or alternatively the desired environmental temperature for the space outside the composite exhaust flue. The interior layer 116 may include the same or different insulation as that described for the insulating layer 114. Additionally, the interior layer may provide additional support or structure to the ceramic composite panel 100. For example, the interior layer 116 may include a rigid or semi-rigid, porous foam material which provides structural support for the ceramic composite panel. By using a foam material, the composite exhaust flue may maintain its structural integrity while benefiting from a weight reduction when compared to other thermally insulating systems. In some embodiments, the foam material may include, but is not limited to, ceramic foams, ceramic aerogels, carbon foam, metal foams, polymeric foam, high temperature polymeric foams, and syntactic foams. In certain embodiments, the foam material may be a closed cell foam or an open cell foam. Further, in some embodiments, the foam material is a lightweight material. In certain embodiments the foam material may have a density ranging from about 0.05 g/cc to about 0.8 g/cc. Further, the foam material may have a compressive strength above about 20 psi, in other embodiments the compressive strength may range from about 200 psi to about 5,000 psi. In some embodiments, the structural support layer may have a thermal conductivity below about 5 W/m K. In further embodiments, the structural support layer may have a thermal conductivity below about 1 W/m K. In certain embodiments the structural support layer may comprise carbon foam having a density ranging from about 0.05 g/cc to about 0.8 g/cc, a compressive strength ranging from about 200 psi to about 5,000 psi, and a thermal conductivity below about 1 W/m K.

The thickness of the interior layer 116 is not particularly limited and may vary widely. If used to provide structural support, the thickness should be sufficient to provide the required or desired mechanical stability to the ceramic composite panel. In certain embodiments, the thickness of the interior layer may range from about ⅛ of an inch to about 2 inches, or greater.

The outer panel layer 118 provides additional dimensional stability to ceramic composite panel. In some embodiments, the outer panel layer 118 may include but is not limited to, CFCC, polymer matrix composites, metal matrix composites, carbon fiber composites, ceramics, glass, metal, polymer coatings, or other materials that may be coated on the surface of the structural support layer 16. In some embodiments, the outer panel layer 118 is made from the same material as the face sheet 112. In additional embodiments, the outer panel layer 118 is made from the same material as the face sheet 112 and is formed integrally with the face sheet 112.

Some embodiments of a thermally insulating composite may include two or more insulating layers and/or interior layers. For example, in some embodiments, additional insulating layers and structural layers may alternate through the thickness of the ceramic composite panel. In further embodiments, additional insulating layers and/or additional interior layers may be repeated in any combination through the thickness of the panel which may provide for additional acoustic dampening or thermal isolation.

The ends of the ceramic composite panels may be sealed with the same materials used for the CFCC face sheet described above. Alternatively flanges or other similar devices may be used to seal the ends of the composite gas flue around the through bore.

In constructing the ceramic composite panels, layers that have incompatible cure temperatures may be formed and cured separately prior to assembling the composite gas flue. Any adjacent layers having substantially compatible cure temperatures may be constructed and cured together. Each of the layers or components of the composite exhaust flue may be adhered to one another using compatible glues and adhesives having use temperatures which substantially match or exceed the use temperature of adjacent layers of the composite exhaust flue. Standard techniques for assembling composite materials may be used for constructing the composite exhaust flue.

Figure 5:
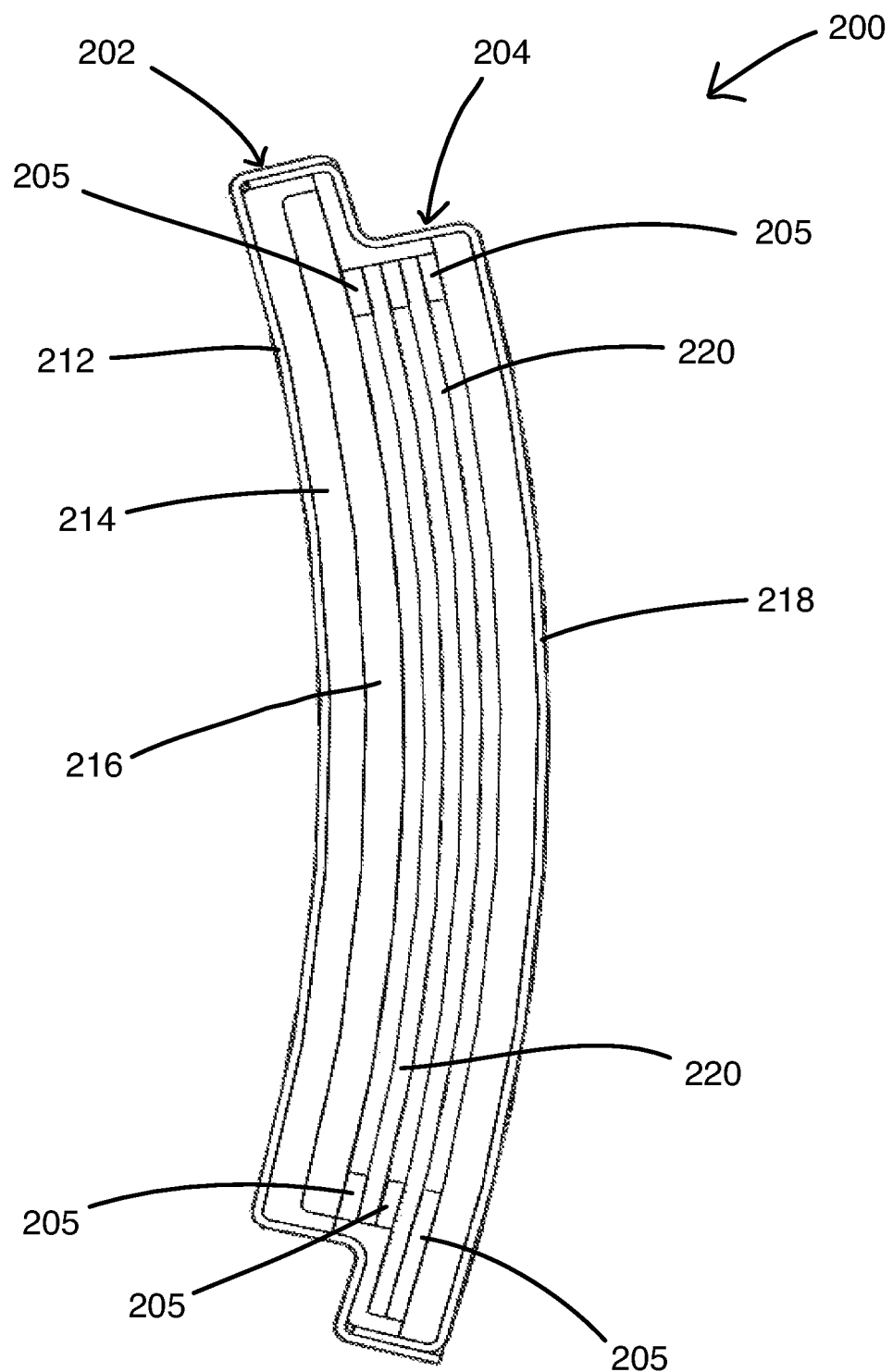
FIG. 5 is a cross-sectional diagrammatic view of a ceramic composite panel in accordance with another embodiment of the invention.

With reference now to FIG. 5, there is shown another embodiment of a ceramic composite panel 200. The ceramic composite panel 200 has sides 202 that engage with and interlock with sides of adjacent ceramic composite panels through panel side connectors 204. The ceramic composite panel sides 202 each have a panel side connector 204 adapted to receive the side of an adjacent ceramic composite panel. In some embodiments, the panel side connector 204 may be configured as to provide lap joints, tongue and groove joint, and other similar joints. The configuration of the panel side connectors 204 provide for non-permanent complementary mating engagement of sides of adjacent ceramic composite panels. Preferably, the physical contact of the sides of the ceramic composite panels provides enough support through the configuration of the side panel side connectors that glues, adhesives, and other more permanent attachment components are not necessary. This allows for easy replacement of one or more of the ceramic composite panels when necessary.

The ceramic composite panel 200 includes a ceramic fiber reinforced ceramic composite material ("CFCC") face sheet 212 positioned over an insulating layer 214 and spaced a distance from an outer panel layer 218. The ceramic composite panel 200 is designed such the structure of the vehicle is exposed to a temperature less than the temperature of the exhaust gases traveling through the through bore. In some embodiments, the temperature reduction may range from about 20% to about 90% and preferably at least about 50%.

The CFCC face sheet 212 will generally be the layer of the ceramic composite panel that will be in contact with the high temperature environment traveling through the throughbore of the exhaust flue and has the composition and properties previously described in the above embodiments for CFCC face sheet 112. The thickness of the CFCC face sheet 212 is not particularly limited and may depend upon a variety of design factors. For many embodiments the thickness of the CFCC face sheet may be at least about 0.02 inches. For some embodiments, the thickness of the CFCC face sheet may range from about 0.02 inches to about 1 inch, or greater. In certain embodiments, the thickness of the CFCC face sheet may range from about 0.1 inches to about 0.5 inches. In other embodiments, the thickness of the CFCC face sheet may range from about 0.1 inches to about 0.25 inches.

With continued reference to FIG. 5, a first insulating layer 214 is provided between the CFCC face sheet 212 and an outer panel layer 218. In the embodiment shown in FIG. 5, the first insulating layer is positioned adjacent to the CFCC face sheet 212. The first insulating layer 214 is a layer of material that is mechanically and chemically robust with respect to the high temperature environment in which the composite will be used. In certain embodiments, the first insulating layer 214 may withstand temperatures of at least about 700° F. without significant physical or chemical degradation. In some embodiments, the first insulating layer 214 may withstand temperatures ranging from about 700° F. to about 2000° F., or higher without significant mechanical or chemical degradation. In some embodiments, the first insulating layer 214 is physically and chemically robust over the same or similar temperatures as the CFCC face sheet 212.

The first insulating layer 214 is adapted to reduce the heat transport from the CFCC face sheet 212 to the outer panel layer 218 whereby the outer panel layer 218 is exposed to a temperature about equal to or below the use temperature of the outer panel layer 218. The use temperature of the outer panel layer 218 is that temperature above which, the material comprising the outer panel layer begins to lose its chemical and physical integrity in air. Further the first insulating layer 214 aids in reducing the desired environmental temperature for the space outside the composite exhaust flue. The first insulating layer 214 may be made from the same materials and have the same properties as those described for the insulating layer 114 previously described above.

The thickness of the first insulating layer 214 is not particularly limited and may vary widely depending on a variety factors, including but not limited to, the exposure temperature of the high temperature environment, the materials used for the high temperature face sheet, the use temperature of the structural support layer, and the composition and form of the insulating layer. The thickness if the first insulating layer 214 should be sufficient to reduce the heat transport through the ceramic composite panel 200, such that when provided in combination with other internal features of the ceramic composite panel, the temperature the outer panel layer 218 is exposed to is less than the use temperature for the outer panel layer 218. The first insulating layer 214 may provide mechanical isolation between the CFCC face sheet 212 and the outer panel layer 218. Still further, the first insulating layer 214 may provide acoustical dampening and vibration isolation benefits.

With the embodiment illustrated in FIG. 5, a first interior layer 216 may be used with the ceramic composite panel 200 and positioned between the insulating layer 214 and the outer panel layer 218. In certain embodiments, the first interior layer 216 is positioned adjacent to the first insulating layer 214 and spaced a distance from the outer panel layer 218. In certain embodiments the first interior layer 216 reduces the temperature from the first insulating layer down to or below the use temperature of the outer panel layer 218 or alternatively the desired environmental temperature for the space outside the composite exhaust flue. The first interior layer 216 may include the same or different insulation as that described for the insulating layer 214. Additionally, the first interior layer may provide additional support or structure to the ceramic composite panel 200. For example, the first interior layer 216 may include a rigid or semi-rigid, porous foam material which provides structural support for the ceramic composite panel. By using a foam material, the composite exhaust flue may maintain its structural integrity while benefiting from a weight reduction when compared to other thermally insulating systems. In some embodiments, the foam material may include, but is not limited to, ceramic foams, ceramic aerogels, carbon foam, metal foams, polymeric foam, high temperature polymeric foams, and syntactic foams. In certain embodiments, the foam material may be a closed cell foam or an open cell foam. Further, in some embodiments, the foam material is a lightweight material. In certain embodiments the foam material may have a density ranging from about 0.05 g/cc to about 0.8 g/cc. Further, the foam material may have a compressive strength above about 20 psi, in other embodiments the compressive strength may range from about 200 psi to about 5,000 psi. In some embodiments, the structural support layer may have a thermal conductivity below about 5 W/m K. In further embodiments, the structural support layer may have a thermal conductivity below about 1 W/m K. In certain embodiments the structural support layer may comprise carbon foam having a density ranging from about 0.05 g/cc to about 0.8 g/cc, a compressive strength ranging from about 200 psi to about 5,000 psi, and a thermal conductivity below about 1 W/m K.

The thickness of the first interior layer 216 is not particularly limited and may vary widely. If used to provide structural support, the thickness should be sufficient to provide the required or desired mechanical stability to the ceramic composite panel. In certain embodiments, the thickness of the first interior layer 216 may range from about ⅛ of an inch to about 2 inches, or greater.

With continued reference to FIG. 5, the ceramic composite panel may include one or more layers of a secondary insulating layer 220. The secondary insulating layers 220 are positioned between the first insulating layer 214 and the outer panel layer 218. In the embodiment shown in FIG. 5, the secondary insulating layers 220 are positioned between the first interior layer 216 and the outer panel layer 218. In some embodiments the secondary insulating layers 220 are separated from each other and from other layers within the ceramic composite panel 200. Any rigid or semi-rigid material may be used to along the ends 202 on the interior of the panel to separate the secondary insulating layers 220 from one another as well as provide a gap or spacing therebetween. In the embodiment shown in FIG. 5, spacers 205 are used to provide separation of the secondary insulating layers 220 from the first interior layer 216, between each secondary insulating layers 220 and the outer panel layer 218. In some embodiments, the spacers may be made from any of the rigid or semi-rigid materials used for the first interior layer 216 or the CFCC face sheet 212. The secondary insulating layers 220 may be separated by an air gap between the layers as shown in FIG. 5, or alternatively another layer of insulating material or structural material such as the foams described above may be used between the layers of the secondary insulating layers 220.

The number of secondary insulating layers 220 is not particularly limited and may vary based on design considerations and the types of materials being utilized. In some embodiments, the ceramic composite panel includes at least one and preferably 2 or more secondary insulating layers 220. The material used for the secondary insulating layers is not limited except that the material should withstand the relative operating temperatures each layer will be exposed to when the ceramic composite panel is in use. In some embodiments, the secondary insulating layers 220 may be a flexible or compressible ceramic material in the form of felts, wools, cloths, other woven or non-woven ceramic textiles, or ceramic materials. The ceramic material used for the secondary insulating layers 220 may include, but is not limited to, metal oxides, nitrides, borides, basalts, carbides, silicon carbide, and other ceramic materials meeting the temperature requirements of the thermally insulating composite. The metal oxides may include, but are not limited to alumina, silica, magnesia, zirconia, and other metal oxides. In some embodiments, the secondary insulating layers 220 may include glass or quartz fibers. Where two or more secondary insulating layers 220 are utilized, the composition of each secondary insulating layer 220 may be the same, or alternatively the composition of two or more of the secondary insulating layers 220 may be different from one another.

In some embodiments, the sides 202, the CFCC face sheet 212, and the outer panel layer 218 may be made from the same ceramic composite material. In other embodiments the CFCC face sheet 212 and the outer panel layer 218 may be made from different materials.

In use, the composite exhaust flue may be orientated to a hot combustion gas source such that the hot exhaust gases are directed through the through bore of the composite exhaust flue. In certain embodiments the composite exhaust flue is directly connected to a combustion source such that exhaust gases from the combustion source pass directly into the through bore of the composite exhaust flue. In additional embodiments, the composite exhaust flue is in fluid communication with exhaust emitting from a combustion source. The composite exhaust flue may be attached to the combustion source by standard mechanical attachment mechanisms including flanges, screws, bolts, rivets and other similar attachment mechanisms. In some embodiments, the structural support layer may be rigidly or non-rigidly connected to a support structure. Non-rigid connections may utilize, but are not limited to strain isolation mechanisms and techniques.

Having described the invention in detail, one skilled in the art reading the specification will understand and appreciate the broad application and teaching contained herein.

What is claimed is:

1. A composite exhaust flue comprising:
    at least one composite exhaust flue segment defining a throughbore extending therethrough, wherein the at least one composite exhaust flue segment comprises:
    an attachment frame comprising a first end spaced a distance from a second end wherein the first end and the second end are held in a fixed relationship by a plurality of frame connectors and wherein the first end and the second end each comprise a panel retainer; and
    a plurality of composite panels arranged about the throughbore and extending from the first end to the second end, wherein the plurality of composite panels are removably held in place by the panel retainer on the first end and the second end, and wherein the plurality of composite panels comprises a ceramic fiber reinforced ceramic composite material face sheet, an outer panel layer, and an insulating layer positioned between the ceramic fiber reinforced ceramic composite face sheet and the outer panel layer.

2. The composite exhaust flue of claim 1, wherein the plurality of composite panels are in interlocking engagement with each adjacent composite panel.

3. The composite exhaust flue of claim 1, wherein the operating temperature range for the ceramic fiber reinforced ceramic composite material face sheet ranges up to about 2000° F. without significant mechanical or chemical degradation.

4. The composite exhaust flue of claim 1, wherein the insulating layer comprises one or more layers of a compressible ceramic material.

5. The composite exhaust flue of claim 4, wherein, the compressible ceramic material may be in the form of felts, wools, cloths, other woven or non-woven ceramic textiles.

6. The composite exhaust flue of claim 1, wherein the ceramic material of the ceramic fiber reinforced ceramic composite material face sheet is selected from the group consisting of metal oxides, nitrides, borides, basalts, carbides, and silicon carbide.

7. The composite exhaust flue of claim 1, wherein the ceramic material of the ceramic fiber reinforced ceramic composite material face sheet comprises a metal oxide selected from the group consisting of alumina, silica, magnesia, and zirconia.

8. The composite exhaust flue of claim 1, wherein the insulating layer may comprise glass or quartz fibers.

9. The composite exhaust flue of claim 1, further comprising supports extending from the ceramic fiber reinforced ceramic composite material face sheet towards the outer pane layer without physically contacting the structural support layer.

10. The composite exhaust flue of claim 1, further comprising supports extending from the outer panel layer towards the ceramic fiber reinforced ceramic composite material face sheet without physically contacting the ceramic fiber reinforced ceramic composite material face sheet.

11. The composite exhaust flue of claim 1, further comprising a structural support layer positioned between the ceramic fiber reinforced ceramic composite material face sheet and the outer panel layer, wherein the structural support layer is selected from the group consisting of ceramic foams, ceramic aerogels, carbon foam, metal foams, polymeric foam, high temperature polymeric foams, and syntactic foams.

12. The composite exhaust flue of claim 11, wherein the structural support layer is a rigid, porous foam material and has a density ranging from about 0.05 g/cc to about 0.8 g/cc, a compressive strength ranging from about 200 psi to about 5,000 psi, and a thermal conductivity below about 5 W/m K.

13. The composite exhaust flue of claim 12, wherein the rigid, porous foam material is carbon foam.

14. A composite exhaust flue comprising:
    at least one composite exhaust flue segment defining a throughbore extending therethrough, wherein the at least one composite exhaust flue segment comprises:
    an attachment frame comprising a first end spaced a distance from a second end wherein the first end and the second end are held in a fixed relationship by a plurality of frame connectors and wherein the first end and the second end each comprise a panel retainer; and
    a plurality of composite panels arranged about the throughbore and extending from the first end to the second end and removably held in place by the panel retainer on the first end and the second end, wherein the plurality of composite panels comprises a ceramic fiber reinforced ceramic composite material face sheet, an outer panel layer, a first insulating layer positioned between the ceramic fiber reinforced ceramic composite face sheet and the outer panel layer, a first interior layer positioned between the first insulating layer and the outer panel layer, and at least one secondary insulating layer positioned between the first interior layer and the outer panel layer.

15. The composite exhaust flue of claim 14, wherein the first insulating layer comprises one or more layers of a compressible ceramic material and the first interior layer is selected from the group consisting of, ceramic foams, ceramic aerogels, carbon foam, metal foams, polymeric foam, high temperature polymeric foams, and syntactic foams, and wherein the at least one secondary insulating layer is a ceramic material.

16. The composite exhaust flue of claim 14, further comprising at least two secondary insulating layers, wherein the at least two secondary layers are separated by an air gap.

\* \* \* \* \*